United States Patent [19]

Kunihiro et al.

[11] 4,407,491
[45] Oct. 4, 1983

[54] RUBBER BEARING DEVICE HAVING AIR DAMPING CAPACITY

[75] Inventors: Motoo Kunihiro, Ibaraki; Tomiaki Atsumi; Kazumasa Kuse, both of Toyota; Masahiro Ishigaki, Ibaraki, all of Japan

[73] Assignees: The Toyo Rubber Industry Co., Ltd., Osaka; Toyoto Jidosha Kogyo Kabushiki Kaisha, Toyota, both of Japan

[21] Appl. No.: 308,769

[22] Filed: Oct. 5, 1981

[30] Foreign Application Priority Data

Oct. 9, 1980 [JP] Japan ................ 55-141193

[51] Int. Cl.³ .................................. F16F 15/08
[52] U.S. Cl. ...................... 267/140.1; 267/63 R; 267/63 A; 267/140.5; 267/141.4; 267/153
[58] Field of Search ............ 267/140.1, 140.5, 141, 267/141.2, 141.4, 141.5, 63 R, 63 A, 153; 248/632, 562

[56] References Cited

U.S. PATENT DOCUMENTS 4,199,128 4/1980 Van den Boom et al. ...... 267/140.1
4,288,063 9/1981 Brenner et al. ................ 267/153
4,352,487 10/1982 Shtarkman ..................... 248/562

FOREIGN PATENT DOCUMENTS 2041185 10/1980 United Kingdom ............ 267/140.1

Primary Examiner—Lenard A. Footland
Attorney, Agent, or Firm—Flynn, Thiel, Boutell & Tanis

[57] ABSTRACT

A rubber bearing device having air damping capacity which comprises upper and lower fitments;
a rubber cylindrical body interposed between the fitments defining an air chamber capable of volume-changing;
a rubber piston shaped body whose shaft is fitted hermetically in the cylindrical body and is firmly bonded to the upper fitment, said piston-shaped body being provided in the air chamber to divide it into upper and lower air chambers; said upper and lower air chambers being adapted to release air therefrom or to admit air thereto through an orifice; and
a depression diaphragm member provided associating with one or both of the chambers, said diaphragm member being capable of decreasing the magnitude of effective volume change by a definite magnitude.

9 Claims, 16 Drawing Figures

MAGNITUDE OF EFFECTIVE VOLUME CHANGE

PROVIDED WITH DIAPHRAGM

NO DIAPHRAGM

RUBBER BEARING DEVICE HAVING AIR DAMPING CAPACITY

This invention relates to a rubber bearing device having dynamic spring characteristics due to air, and more particularly, to a rubber bearing device having air damping capacity which is possessed of such ideal spring characteristics that its dynamic spring rate in the high frequency region is small and its damping coefficient in the low frequency region is large, and which can be constructed compactly.

In resiliently supporting or bearing various kinds of vibration generating machines, such as automobile engines, by means of a rubber vibration insulator, a resonance phenomenon occurs on the occasion of actuation or stopping of the machines or owing to the excitation caused because of the frequency component which the machines have in the neighbourhood of the natural frequency of the support system, and as a result, the excessive vibrational amplitude is likely to cause various troubles.

In order to suppress the resonance of this kind, rubber material as a high damping material has been heretofore used. However, rubber material has the defects or disadvantages that it exhibits large creep or "collapse" phenomenon and has a poor vibration insulation capacity against high frequency vibration because of the increase in the modules of elasticity.

Recently the trend in vibration dampers or vibration insulators has been toward using a so-called air spring which is based on the dynamic spring rate inherent in air in order to obviate such defects. In this case, a large volume air chamber is required to carry a heavy load, thus leading to a big-size rubber bearing device. On the other hand, if the damping characteristics of the air spring in the low frequency region having a high amplitude are enhanced by increasing the damping coefficient due to air, then the dynamic spring rate due to air will be increased in proportion to the increase, which results in a decrease in the vibration absorption capacity in the high frequency region. Conversely, if the vibration absorption performances in the high frequency region are enhanced, damping characteristics in the low frequency region will naturally be decreased. In particular where the air spring is used as a bearing device for an engine mounted on a car, the rpm of the engine changes over a wide range, so that there have occurred many inconveniences or troubles. An improvement in this regard has therefore been strongly desired.

In order to meet and overcome the prior art problems set forth above, the present invention has been accomplished and is designed to provide a novel rubber bearing device having an air damping capacity which device is capable of exhibiting a satisfactory vibration insulation capacity both in the low and high frequency regions. The object of this invention has been achieved by the construction of a bearing device characterized in that there are provided two upper and lower air chambers, in connection with which a depression diaphragm member is provided.

This invention will be hereinbelow described in more detail with reference to preferred embodiments as shown in the accompanying drawings, in which.

Figure 1:
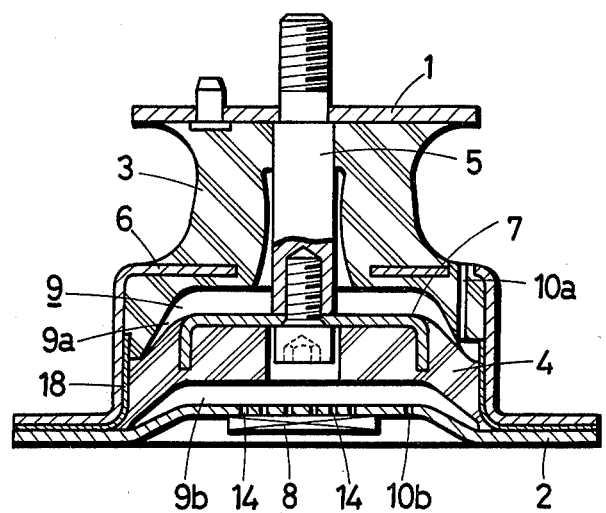
FIG. 1 and FIG. 3 are vertical cross-sectional views of two different examples of the invention of a type wherein a depression diaphragm member communicates with a lower air chamber and the atmosphere.

Now referring to FIG. 1 to FIG. 4, a rubber bearing device mainly comprises an upper fitment 1, a lower fitment 2, a rubber cylindrical body 3, a rubber piston-shaped body 4 and a depression diaphragm member 8.

The depression diaphragm member 8 which constitutes one of the essential features of this invention serves to absorb a part of the magnitude of the volume change caused in air chambers (9a, 9b in the figures) owing to mechanical vibration. Stated another way, the depression diaphragm member 8 is adapted to decrease the magnitude of effective volume change by a definite magnitude, whereby it is possible not to raise extremely the inner pressure of the air chambers in the high frequency region.

One preferred example of the member is a depression diaphragm member which comprises a flexible diaphragm such as a rubber diaphragm and plates provided at a predetermined distance from both sides of the diaphragm to constrain the mobile range of the diaphragm. Another preferred example is a depression diaphragm member that has a suppleness in a slight deformation while it increases sharply in tension in deformations above a definite (threshold) value of deformation, thus making it difficult to deform, for example, a cord-incorporated rubber diaphragm.

The upper fitment 1 is an upper seat on which a vibration generator, e.g. an engine, is to be mounted whereas the lower fitment 2 is a lower seat to be fixed on a frame body, e.g. a vehicle. The fitting mode at both the fitments may, of course, be inverse to this mode.

The rubber cylindrical body 3 is formed to be an hourglass-shaped cylinder whose center is pierced through with an opening for receiving and hermetically fitting a shaft or rod 5 therein. The body 3 is interposed between the upper and lower fitments 1, 2 with the upper surface thereof being hermetically unitedly bonded to the upper fitment 1 and with the lower surrounding surface thereof being bonded hermetically and firmly to the lower fitment 2.

The shape of the rubber cylindrical body 3 is not limited to a cylinder shape, but may be chosen appropriately.

By the bonding, there is defined a void enclosed by the lower surface of the rubber cylindrical body 3 and the lower fitment 2, the void serving as air chamber 9 capable of a change of volume.

The rubber piston-shaped body 4 is formed in an appropriate shape. It is, on the one hand, firmly secured to the upper fitment 1 through the shaft portion 5 which is received and hermetically fitted in the rubber cylindrical body 3. It is, on the other hand, disposed horizontally within the air chamber 9 thereby to divide it into an upper chamber 9a and a lower chamber 9b.

The rubber cylindrical body 3 and the rubber piston-shaped body 4 are, when shaped in a mold, joined and attached to rigid annular elements 6 and 18 at the respective perimeters of them so as to be integrally secured to the lower fitment 2. The rubber piston-shaped body 4 is further rigidly affixed to a rigid plate 7 in order to increase the mechanical fixing of the body 4 to the shaft 5.

The upper fitment 1 and the shaft 5 can be united together by welding the fitting parts of them or by fastening the threaded part on the head of the shaft 5 to a housing of an engine or a vehicle or other frame body by means of a nut.

In the bearing device thus constructed, when an engine body is vibrated, the rubber cylindrical body 3 undergoes a dynamic compressive flexure through the upper fitment 1, and the rubber piston shaped body 4 is subjected to upper and lower compressive flexures through the shaft 5, whereby the upper air chamber 9a and the lower air chamber 9b are changed in volume, respectively.

When the volume changes, air is withdrawn from one and is admitted to other of the chambers 9a, 9b, l whereby a suitable damping capacity is exhibited. To that end, in the embodiments shown in FIG. 1 and FIG. 2, an orifice 10a having a throttling function is provided in an appropriate position of the rubber cylindrical body 3 to connect the upper chamber 9a to the atmosphere whereas an orifice 10b having a throttling function, for connecting the lower air chamber 9a to the atmosphere, is defined in an appropriate position of the lower fitment 2.

It is theoretically apparent that the magnitude of the damping ability obtained by the throttling effect of air passing through the orifices 10a, 10b is proportional to the rate of volume change of the chambers 9a, 9b to dynamic displacement and is inversely proportional to the volume of the air chambers 9a, 9b. Therefore, a synergistically high damping capacity is obtainable by the provision of two air chambers 9a, 9b.

Figure 3:
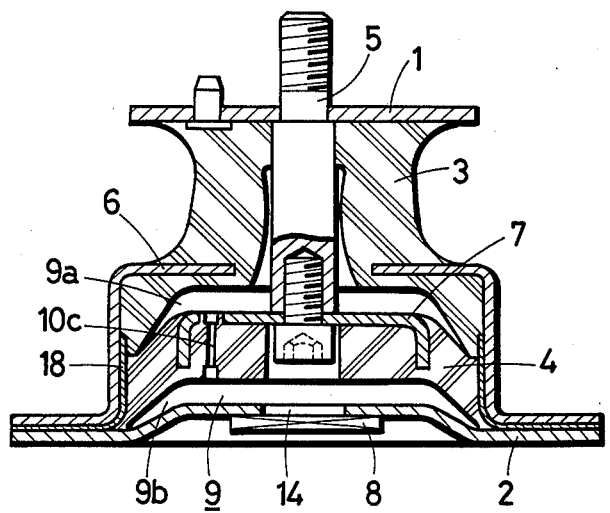
Figure 4:
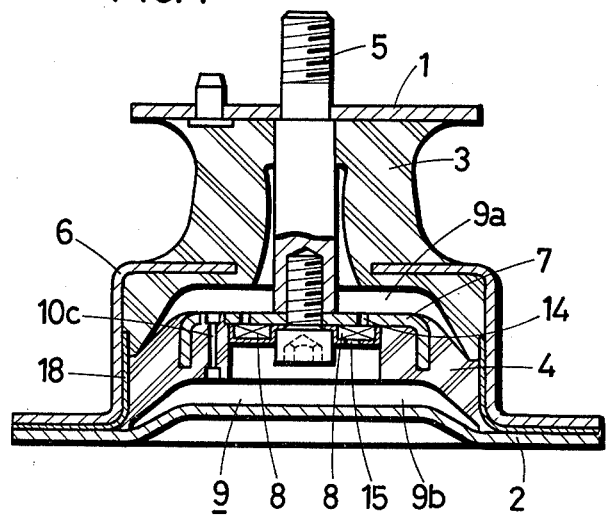

In the embodiments shown in FIGS. 3 and 4, an orifice 10c is provided through the rubber piston shaped body 4 to communicate with the upper and lower air chambers 9a, 9b whereby both the chambers are shut off from the atmosphere. When the rubber piston shaped body 4 is oscillated up and down, the volume of one of the upper and lower chambers 9a, 9b is increased and the volume of the other chamber is decreased, so that the direction of flow of the air stream passing through the orifice 10c is alternately reversed from one direction to the other opposite direction and accordingly, the damping function due to the throttling effect of the orifice 10c is sufficiently exhibited similarly to the case where the air chambers are connected to the atmosphere. In this way, it is possible to attain the desired object of the invention.

It is another feature of this invention that each of the bearing devices as shown in FIG. 1 to FIG. 4 is provided with the depression diaphragm member 8 in addition to the structural elements described above.

Figure 5:
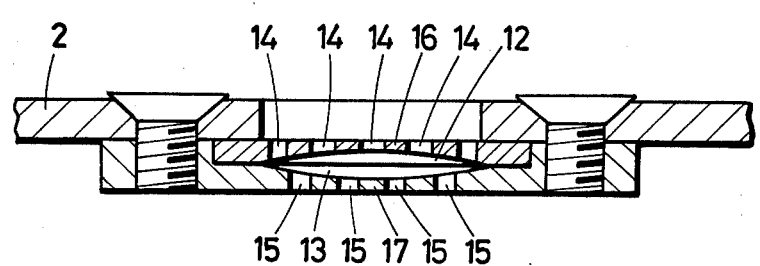
FIG. 5, FIG. 6 and FIG. 8 are enlarged cross-sectional views of depression diaphragm members used in the devices of the type illustrated in FIG. 1 and FIG. 3.
Figure 6:
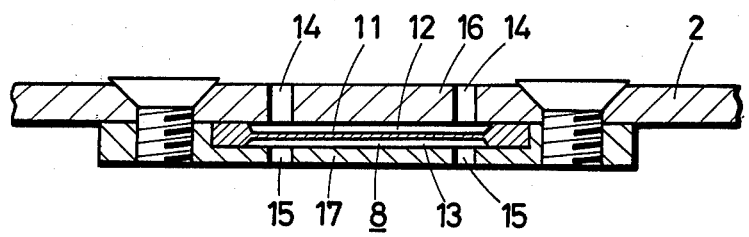
Figure 7:
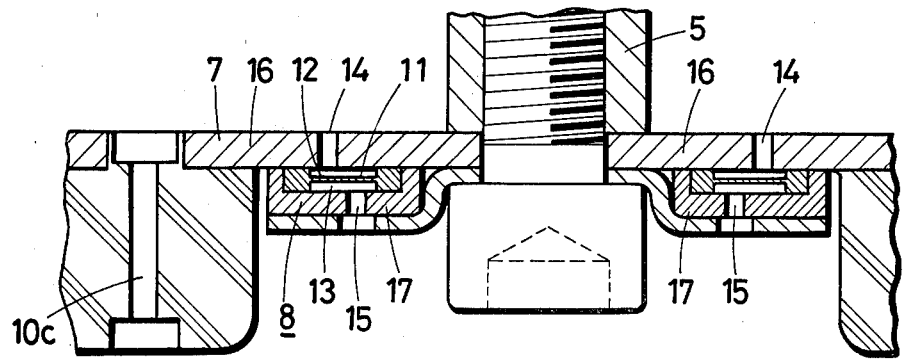
FIG. 7 and FIG. 9 are enlarged cross-sectional views of depression diaphragm members used in the devices of the type shown in FIG. 2 and FIG. 4.

The depression diaphragm member 8, examples of which are shown in FIG. 5 to FIG. 7, comprises a diaphragm 11 having suppleness and plates 16, 17 for restraining the deformation of the diaphragm 11 which plates are provided on both sides of the diaphragm.

Figure 8:
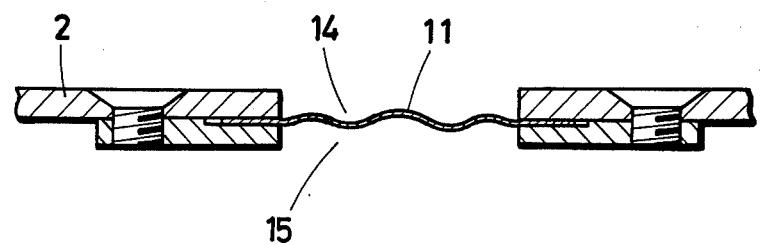
Figure 9:
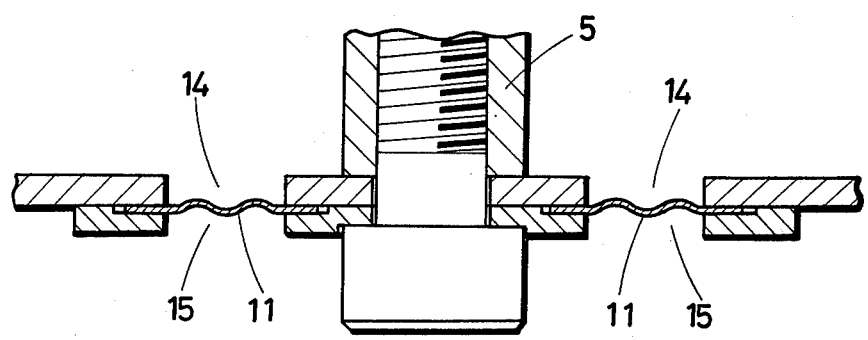

Other examples of the depression diaphragm member are shown in FIG. 8 and FIG. 9. The diaphragm 11 retains a suppleness upon receiving a slight deformation while it increases sharply in tension upon receiving deformations above a definite deformation, so that it is difficult to deform, for example, a cord-incorporated rubber diaphragm 11.

The depression diaphragm member 8 may be disposed in a suitable place in association with either or both of the air chambers 9a, 9b.

In the embodiments shown in FIGS. 1 and 3, the depression diaphragm member 8 is joined to the bottom surface of the lower fitment 2, the upper opening 14 thereof communicating with the lower chamber 9b and the lower opening 15 (see FIGS. 5, 6, 8) thereof communicating with the atmosphere.

Figure 2:
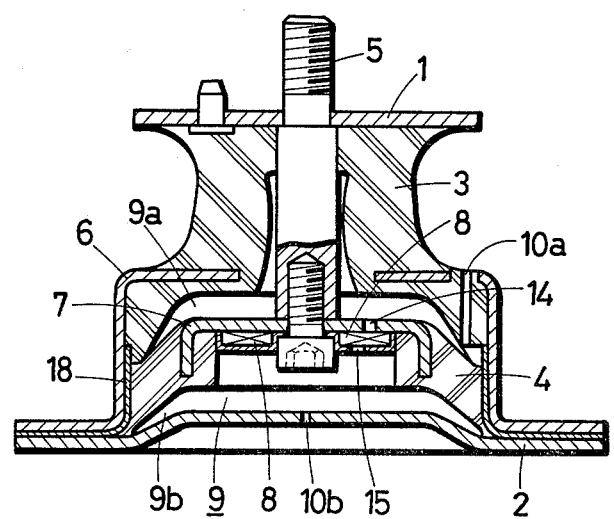
FIG. 2 and FIG. 4 are vertical cross-sectional views of two additional examples of the invention of a type wherein a depression diaphragm member communicates with upper and lower air chambers.

Further embodiments are shown in FIG. 2 and FIG. 4, wherein the depression diaphragm member 8 is disposed in the rubber piston-shaped body 4, the upper opening 14 thereof communicating with the upper chamber 9a and the lower opening 15 thereof communicating with the lower chamber 9b.

The number of the depression diaphragm member 8 to be provided is not limited in this invention. One piece of such depression diaphragm member that is constructed so as to be capable of conducting a predetermined volume change my be provided, or otherwise plural pieces of depression diaphragm members whose total volume meets a predetermined volume change may be provided separately or distributively.

The upper opening 14 and the lower opening 15 of the depression diaphragm member 8 are different from the foregoing orifices 10a, 10b, 10c exhibiting a throttling effect. They are preferred to each have a hole of a relatively large passage area taking into account the necessity that a pair of the magnitude of volume change of the upper air chamber 9a or the lower air chamber 9b should be transmitted quickly as a displacement magnitude of the diaphragm 11.

To summarize, it is thus essential that the one opening of the depression diaphragm member 8 communicates with one of the upper and lower air chambers 9a, 9b and the other opening of it communicate with the other chamber 9a or 9b or the atmosphere.

Figure 13:
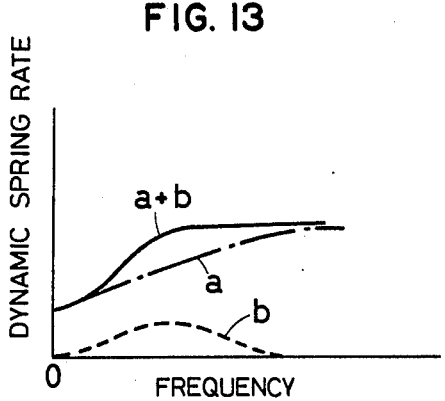
Figure 14:
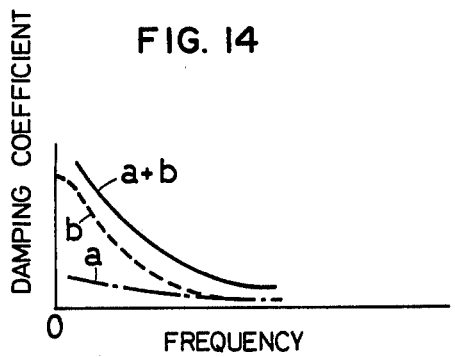

The bearing device of this invention thus constructed as described above can exhibit a vibration absorption function, when subjected to dynamic compressive flexure by reason of vibration, by the action of the spring rate which is a sum a+b of a dynamic spring rate b due to the air within the air chambers 9a, 9b and a dynamic spring rate a due to the rubber bearing portion composed of the rubber cylindrical body 3 and the rubber piston shaped body 4, and of the damping coefficient due to air, as shown in FIGS. 13, 14.

Figure 10:
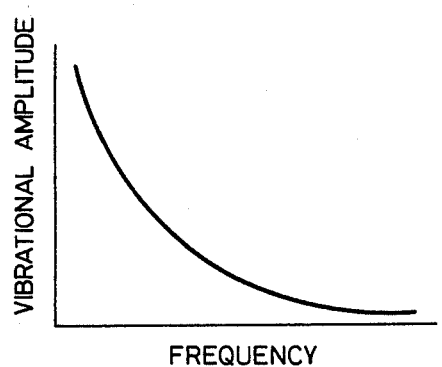
FIG. 10 is a graphical representation of the amplitude characteristic of a mechanical vibration.

In mechanical vibration, in general, its amplitude is large in the low frequency region and small in the high frequency region, as shown in FIG. 10.

On the other hand, the magnitude of volume change of the air chambers 9a, 9b is proportional to the amplitude of vibration, being large in the low frequency region and small in the high frequency region.

Since the bearing device of this invention has two upper and lower air chambers 9a, 9b, it is possible to make the volume of the air chambers large relative to their projected area, so that a sufficient air spring effect can be attained in spite of the small-sized device. Moreover, it is possible to damp the vibration by the throttling action of the orifices 10a, 10b, 10c, which aid in the enhancement in vibration absorption effect together with the cushioning performance due to the air spring effect.

Preferred vibration insulation properties to be imposed on a rubber vibration insulator are in general such that its dynamic spring rate is ensured to be of sufficient values in the low frequency region and to be not so high in the high frequency region whereas its damping coefficient is large in the low frequency region of large amplitude.

Conventional air springs have inevitably had the drawback that their dynamic spring rates are unnecessarily large in the high frequency region. On the contrary, the rubber bearing device of this invention can absorb a part of the magnitude of the volume change caused in the air chamber 9 because of the mechanical vibration by the provision of the depression diaphragm member 8, namely, is enabled to decrease the magnitude of effective volume change of the air chamber by a definite magnitude. Accordingly, it is possible not to raise extremely the inner pressure of the lower air chamber 9b or both the chambers 9a, 9b in the high frequency region (see FIG. 11, FIG. 12) thereby to decrease the dynamic spring rate in the high frequency region. Thus, the transmission of vibration can be shut off effectively over the entire region from the low frequency region to the high frequency region.

Figure 15:
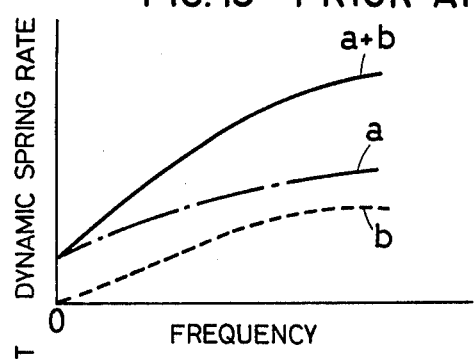
FIG. 15 and FIG. 16 are graphs of the characteristics pertaining to a conventional rubber bearing device having an air damper.
Figure 16:
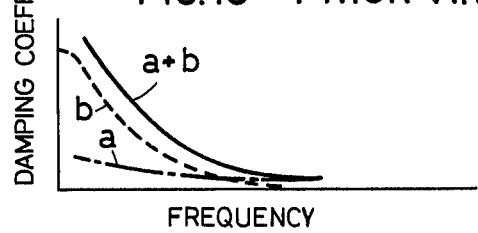

The characteristics with respect to dynamic spring rate and damping coefficient of the invention device are illustrated in FIG. 13 and FIG. 14 while those of a prior art device being not provided with the depression diaphragm 8 are illustrated in FIG. 15 and FIG. 16. As will be apparent from a comparison between both of them, this invention makes it possible to move its values in the low frequency region be relatively larger vis-a-vis its values in the high frequency region than the case of the prior art, whereby the desired object is attained.

Figure 11:
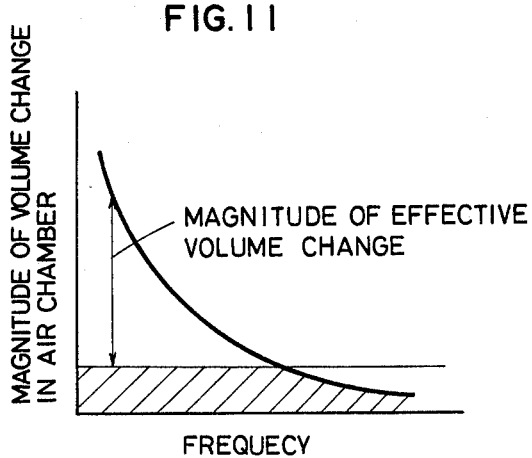
FIG. 11 to FIG. 14 are each a graph of the characteristics pertaining to the devices according to this invention.
Figure 12:
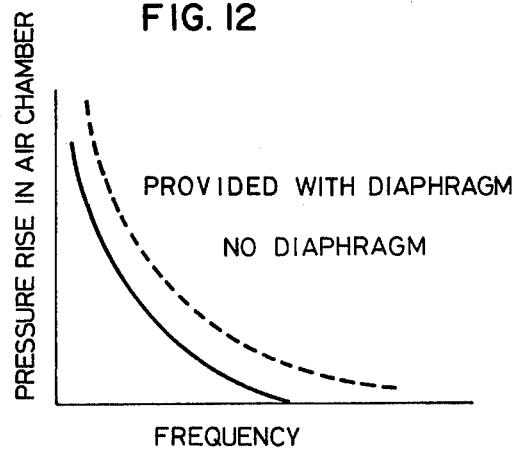

The decrement of volume change, owing to the depression diaphragm member 8, is expressed by the hatched portion in FIG. 11, from which it will be apparent that the values of the decrement are almost constant over the entire range extending from the low frequency region to the high frequency region. Because of this, the rate of change of dynamic spring rate to frequency was made moderate as compared with prior art devices, and therefore, it is possible to enhance the dynamic spring rate in the low frequency region while suppressing the dynamic spring rate in the high frequency region.

As thus far described above, the invention can provide the bearing device capable of bearing and supporting a heavy load with its compact structure, since there are provided two upper- and lower-located air chambers being susceptible of a change of volume caused by the vibration.

Further by the provision of the depression diaphragm member capable of decreasing the magnitude of effective volume change by a definite magnitude, it is possible to decrease the dynamic spring rate while suppressing the rise of inner pressure of the air chambers in the high frequency region, which signifies that the dynamic spring rate in the low frequency region can be enhanced relatively. As a consequence, it is possible to shut off the transmission of vibration effectively over the entire frequency region, thus exhibiting highly efficient vibration insulation performances.

What we claim is:

1. A rubber bearing device having air damping capacity which comprises
    upper and lower fitments, one of which is adapted to have a vibration-causing device mounted thereon;
    a rubber cylindrical body which is interposed between said upper and lower fitments with the upper surface and the lower peripheral surface thereof being bonded firmly and hermetically to said upper and lower fitments, respectively, said cylindrical body defining an air chamber capable of having its volume changed, said chamber being closed by the lower surface of said cylindrical body and said lower fitment;
    a rubber piston-shaped body having an upright shaft portion extending through and fitted hermetically in said cylindrical body and bonded firmly and integrally to said upper fitment, said piston-shaped body being disposed within said air chamber thus dividing it into two upper and lower air sub-chambers, orifices communicating with said upper and lower air sub-chambers for releasing air from or for admitting air to said sub-chambers; and
    a depression diaphragm member provided in association with said upper and lower sub-chambers, one opening of said depression diaphragm member communicating with one of said sub-chambers and the other opening of which member communicates with the other sub-chamber, said depression diaphragm member being capable of decreasing the magnitude of effective volume change by a definite magnitude.

2. A rubber bearing device as claimed in claim 1, wherein said upper and lower air sub-chambers each are adapted to be opened to the atmosphere through one of said orifices.

3. A rubber bearing device as claimed in claim 1, wherein said upper and lower air sub-chambers communicate with each other through one of said orifices.

4. A rubber bearing device having air damping capacity which comprises
    upper and lower fitments, one of which is adapted to have a vibration-causing device mounted thereon;
    a rubber cylindrical body which is interposed between said upper and lower fitments with the upper surface and the lower peripheral surface thereof being bonded hermetically and firmly to said upper and lower fitments, respectively, said rubber cylindrical body defining an air chamber capable of having its volume changed, said chamber being closed by the lower surface of said cylindrical body and said lower fitment;
    a rubber piston-shaped body having an upright shaft portion extending through and fitted hermetically in said cylindrical body and bonded firmly to said upper fitment, said piston-shaped body being disposed within said air chamber thus dividing it into two upper and lower air sub-chambers, orifices communicating with said upper and lower air sub-chambers for releasing air from or admitting air to said sub-chambers; and
    a depression diaphragm member provided in association with one of the air sub-chambers, one opening of said depression diaphragm member communicating with one of said sub-chambers and the other opening communicating with the atmosphere.

5. A rubber bearing device as claimed in claim 4, wherein said upper and lower air sub-chambers each are adapted to communicate with the atmosphere through an orifice.

6. A rubber bearing device as claimed in claim 4, wherein said upper and lower air sub-chambers communicate with each other through an orifice.

7. A rubber bearing device as claimed in claim 1 or claim 4, wherein said depression diaphragm member is composed of a rubber diaphragm and two plates disposed on opposite sides of said diaphragm to restrain the movement of it.

8. A rubber bearing device as claimed in claim 1 or claim 4, wherein said depression diaphragm member is a cord-incorporated rubber diaphragm.

9. A vibration device, comprising
an upper fitment and a lower fitment, one of said fitments being adapted to have a vibration-causing device mounted thereon;
a cylindrical rubber body disposed between said upper and lower fitments, the upper surface of said cylindrical rubber body being hermetically bonded to said upper fitment, the lower surface of said cylindrical rubber body being spaced upwardly from said lower fitment and having a downwardly opening cavity therein;
a first rigid annular element whose upper end is bonded to said cylindrical rubber body adjacent to the lower end thereof and whose lower end is bonded to said lower fitment, said first rigid annular element and said cavity defining an internal air chamber;
a piston-shaped rubber body having an annular peripheral portion confined between the lower surface of said cylindrical rubber body and the upper surface of said lower fitment, said peripheral portion of said piston-shaped rubber body being disposed within said first rigid annular element, said piston-shaped rubber body having a central portion extending across said internal air chamber and dividing same into an upper sub-chamber and a lower sub-chamber, said central portion of said piston-shaped rubber body being capable of flexing upwardly and downwardly within said air chamber to effect complementary changes of the volumes of said sub-chambers;
a shaft extending upwardly from the center of said piston-shaped rubber body, said shaft extending upwardly through said cylindrical rubber body and being hermetically sealed and bonded to said cylindrical rubber body and said upper fitment so that vibrations imparted to said upper fitment effect movement of said central portion of said piston-shaped rubber body; and
a depression diaphragm member sealed and coupled to one of said sub-chambers for being acted on by the air in said one sub-chamber, said depression diaphragm member being imperforate and being capable of being flexed by the pressure of the air in said one sub-chamber so that an increase of the pressure of the air in said one sub-chamber is partially absorbed by flexing of said depression diaphragm member.

* * * * *

UNITED STATES PATENT AND TRADEMARK OFFICE
CERTIFICATE OF CORRECTION

PATENT NO. : 4,407,491

DATED : October 4, 1983

INVENTOR(S) : Motoo Kunihiro et al

It is certified that error appears in the above-identified patent and that said Letters Patent is hereby corrected as shown below:

Column 7, line 12, after "vibration" insert -- damping --.

Signed and Sealed this

Third Day of January 1984

[SEAL]

Attest:

GERALD J. MOSSINGHOFF

Attesting Officer

Commissioner of Patents and Trademarks